Figure 1:
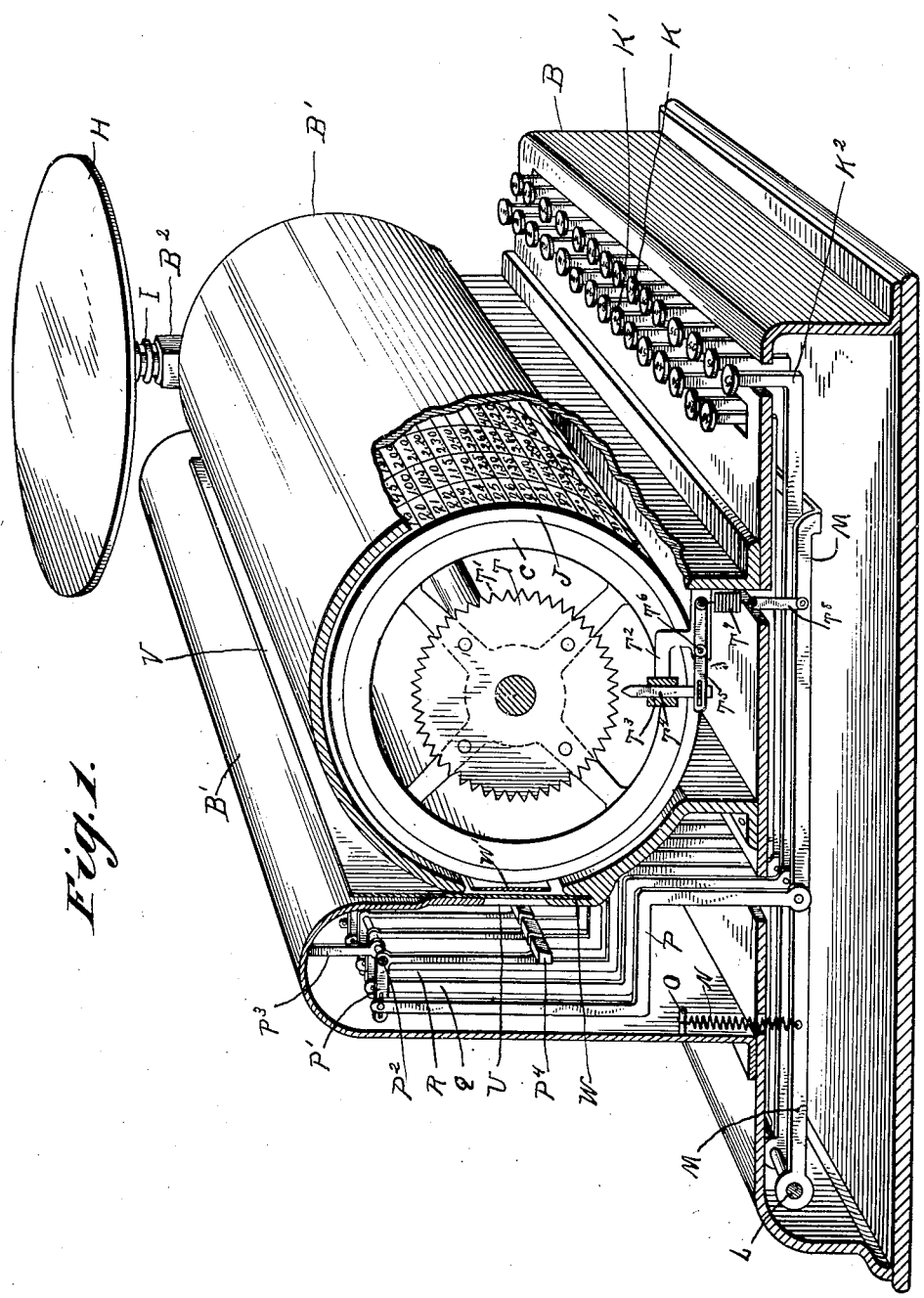

G. W. MEYER.
COMPUTING AND RECORDING SCALE.
APPLICATION FILED JULY 7, 1911.

1,052,501.

Patented Feb. 11, 1913.

3 SHEETS—SHEET 1.

Witnesses:
Harry C. Heeby
Minnie S. Miller

Inventor
Georg Wilhelm Meyer
By his Attorney
Frank A. Ashley

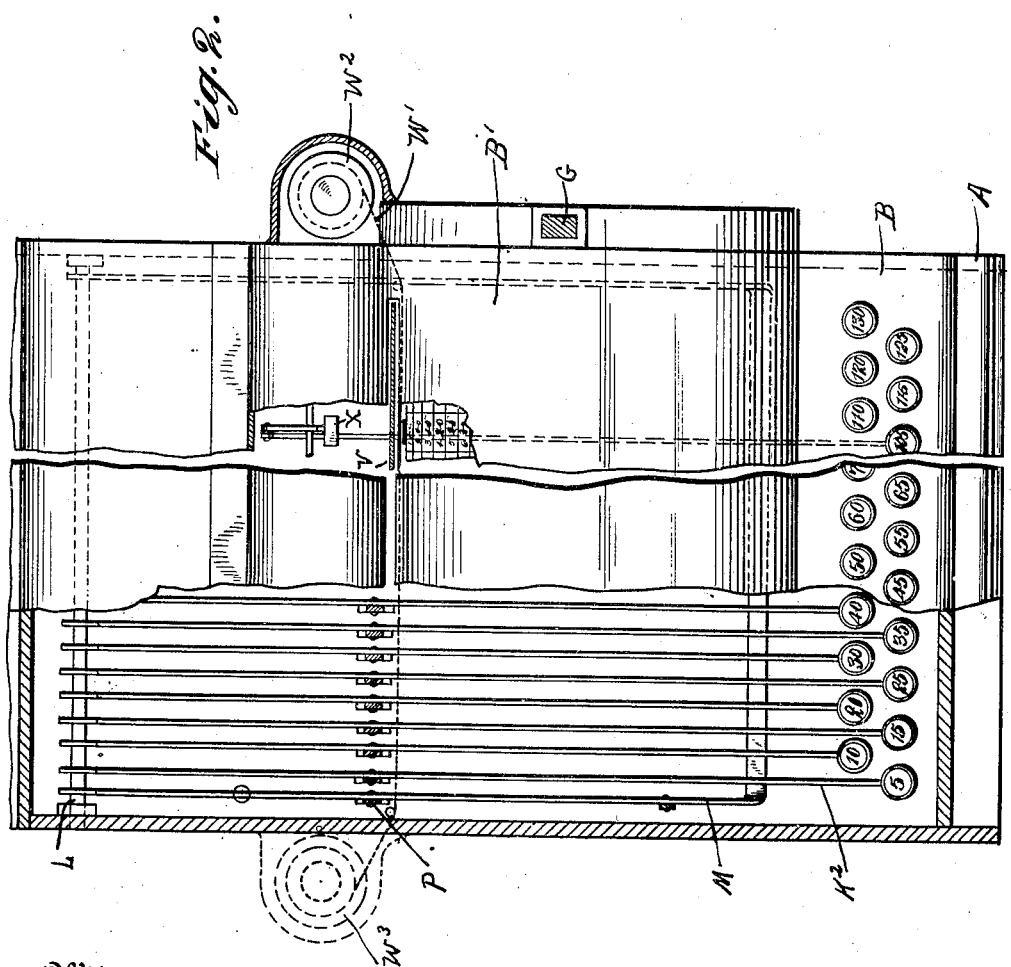

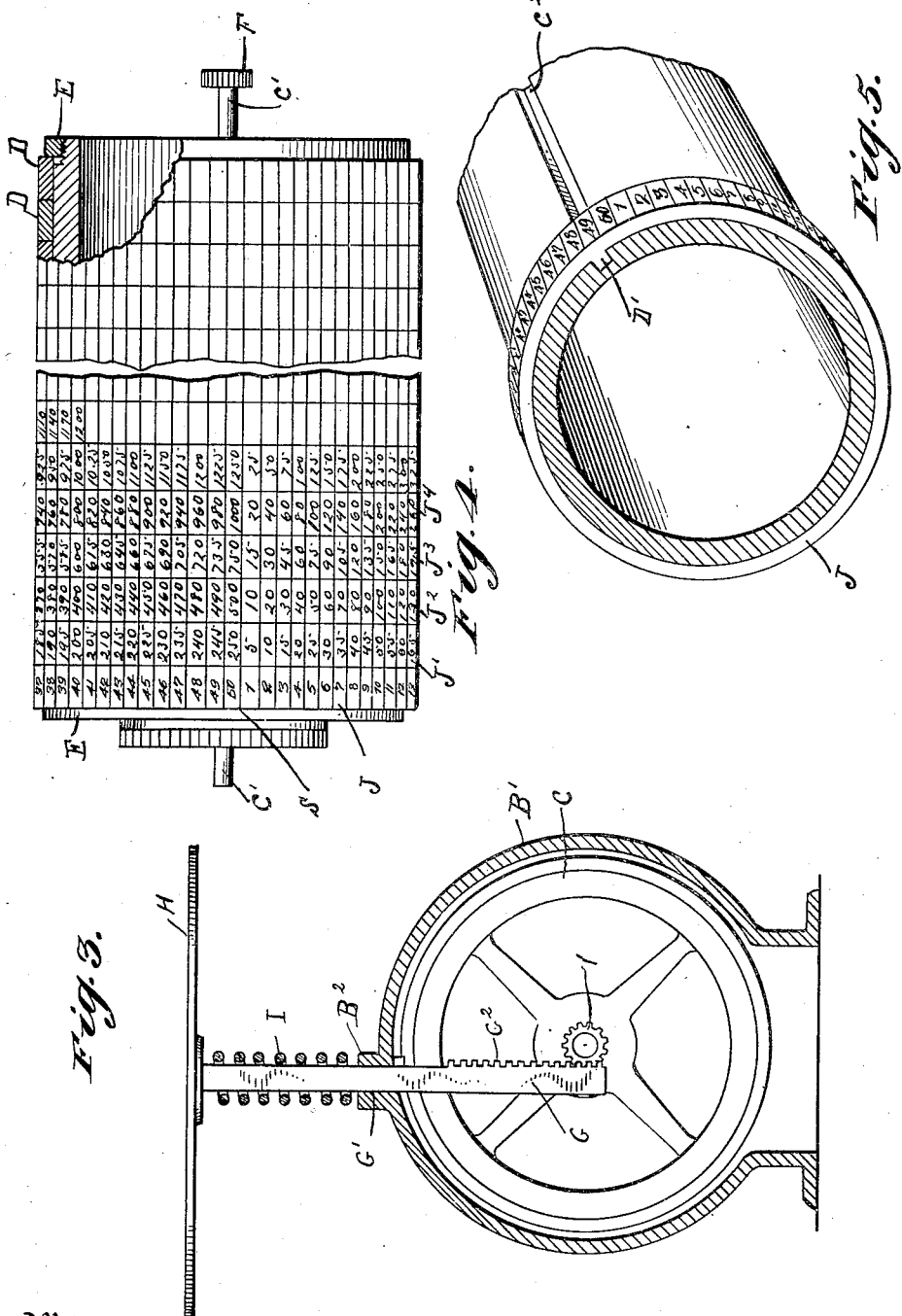

UNITED STATES PATENT OFFICE.

GEORG WILHELM MEYER, OF ROCKAWAY BEACH, NEW YORK.

COMPUTING AND RECORDING SCALE.

1,052,501. Specification of Letters Patent. Patented Feb. 11, 1913.

Application filed July 7, 1911. Serial No. 637,259.

*To all whom it may concern:*

Be it known that I, GEORG WILHELM MEYER, a subject of the Emperor of Germany, and a resident of Rockaway Beach, in the county of Queens and State of New York, have invented certain new and useful Improvements in Computing and Recording Scales, of which the following is a specification.

My invention relates to computing scales and the object of my invention is to provide a computing scale by means of which the charge for carrying a package of given weight between certain points at a known rate per 100 lbs. may be quickly and automatically determined and the weight of said package together with the determined charge, may be printed on a sheet of paper or way-bill.

A further object is to provide a scale in which the package to be shipped will rotate a cylindrical or other suitable form of rotating device which carries type, to cause the type which indicates the weight and cost of carrying said package to be presented opposite the proper hammers so that by depressing the proper rate key, the cost and weight will be simultaneously printed on the way-bill.

Further objects of my invention will be hereinafter disclosed and pointed out in the claims.

Referring to the drawings which form a part of this specification, Figure 1 is a perspective view of one form of my improved scale embodying my invention and shown partly in section. Fig. 2 is a plan view disclosing some of the rate keys and showing one of the hammers located opposite the printing type on the cylinder. Fig. 3 is an end cross sectional view disclosing the connection between the scale platform and cylinder. Fig. 4 is a view of the cylinder, shown partly in section to illustrate the manner of holding the printing rings on the cylinder. Fig. 5 is a perspective view of a portion of the cylinder, shown partly in cross section and discloses the means used to hold the rings in predetermined position on the cylinder.

A, indicates the base board of the machine and B the base frame; B', indicates the upper frame or casing in which the cylinder C is inclosed. The cylinder C is provided with short shafts C' which rest in bearings at each end of the casing B'. The cylinder C is also provided with a longitudinally extending groove $C^2$ and a plurality of rings D are mounted on said cylinder and each ring is provided with an inwardly projecting key portion indicated by D' which enters the groove $C^2$ to prevent the said rings from rotating relative to said cylinder. The rings D are held on the cylinder C by two nuts E which are threaded to engage with the thread formed in the surface of the cylinder and when screwed on the cylinder, serve to clamp the rings D—D, etc. between them.

Mounted and fastened on one end of one of the shafts C' is a pinion wheel F. A rod G is supported in a guide-way G' formed in the casing B' and is provided at its lower end with a rack $G^2$ which engages with the pinion wheel F. A platform H is mounted on the top end of the rod G and a spring I is interposed between the platform H and a boss $B^2$, which boss is cast integral with the casing B'. This spring I is made of such resiliency that under a weight of fifty pounds placed on the platform H, the platform will descend and rotate the cylinder one revolution.

Any other preferred form of transmitting the weight of the package from a platform in order to rotate the cylinder one revolution for a weight of fifty pounds, or one-fiftieth of a revolution for one pound placed on said platform, may be used to accomplish this function, the present form being shown simply to illustrate the idea that a weight of one pound placed on the platform H will rotate the cylinder C one-fiftieth of a revolution and a weight of two pounds, two-fiftieths of a revolution, and so on, up to a weight of fifty pounds, which will turn it one complete revolution.

The ring J is divided into fifty equal divisions and numbers 1 to 50 are placed in the spaces between said divisions to indicate the weight of the package in pounds that may be placed on the platform H. The ring J' located adjacent the ring J is provided with printing characters consisting of numerals in steps of 5, that is from 5 to 250 inclusive. The next ring $J^2$ is also provided with numerals in steps from 10 to 500 inclusive. The next ring $J^3$ is also provided with fifty divisions and numbers from 15 to 750 inclusive. All of the rings are divided into fifty spaces. All of the remaining rings are divided into fifty equal spaces and provided with printing characters as will be more fully hereinafter pointed out.

Two rows of keys indicated by K and K' respectively are located in the base frame B, one of which has the characters 5—15—25—35—45, etc., being odd numbers, while the row K' has characters 10—20—30—40, etc., being even numbers. These keys are mounted on key levers $K^2$ all of which are hinged to a longitudinally extending shaft L, the ends of which are secured to the base frame at each side thereof, as will be readily understood. The weight lever M is also hinged at its ends to the rod L and extends from the rod L toward the front of the machine and is then bent and extends longitudinally of the machine under the key levers and closely adjacent thereto, and then back across the other end of the machine to the rod L, and a helical spring N is connected to said weight lever M and to a pin which pin is fastened to the inner side of the casing B' as illustrated, and by means of the spring N the weight lever is held in its highest position, and by reason of extending under the key levers serves to hold the key levers in their upper normal position. A similar spring to the spring N is fastened to the weight lever at the opposite end of the machine in a similar manner to that just described.

Connected to the weight lever M is a vertically extending link P which connects with a bell-crank lever P', which is mounted on a rod $P^2$ which extends longitudinally of the frame B' and is supported therefrom by a bracket $P^3$ which depends from said base frame B' near each end thereof and mounted on the lower end of the bell-crank lever P' is a hammer $P^4$ provided with a flat face and rectangular in shape.

Connected with each of the key levers is a similar set of levers to that just described, the one adjacent to the link P being indicated by Q and the next one adjacent to Q indicated by R, these links extending the length of the machine and each being connected with a respective key and each being provided with a hammer similar to hammer $P^4$.

The line S is the zero line and when there is no weight placed on the platform H, the line rests opposite the lower edge of the hammer $P^4$ when said hammer is in contact with the face of the cylinder C. Therefore, if a package of 10½ pounds was placed on the platform H, the cylinder would be rotated to bring the line between characters 10 and 11 on the ring J opposite hammer $P^4$ and if the weight lever M was depressed, it would print a part of the figure 10 and part of the figure 11. To obviate this difficulty, a V tooth wheel T is used which wheel is mounted on one end of the cylinder C and is provided with fifty V shaped teeth T', the points of which point directly to the lines dividing the said ring into fifty divisions. A bracket $T^2$ is connected to the frame B' and is provided with a guideway $T^3$ in which is guided a pin $T^4$ having a cone shaped upper end which may be forced upward between the teeth T' to turn the cylinder far enough to bring the characters on the cylinder into perfect position to have the hammers impressing the characters perfectly on the way-bill. This cone shaped pin $T^4$ is operated by means of a lever $T^5$ which is fulcrumed at $T^6$ and is connected to the weight lever M by a closely coiled helical spring $T^7$ and link $T^8$. The casing B' is provided with an opening indicated by U which opening extends the length of the cylinder C and is formed opposite the hammers. The way-bill or paper on which the record is to be printed is indicated by V and is supported in a slot W which slot is formed in the casing B' as illustrated.

Extending the length of the cylinder C' is a typewriter ribbon W' which is mounted on two rollers indicated by $W^2$ and $W^3$ respectively, which ribbon extends from one roller to the other and rests opposite the opening U and over the face of the printing characters on the cylinder C, the way-bill or paper V being disposed between the hammers and said ribbon as illustrated.

Referring to Fig. 2, I have shown the key having the character 105 which indicates the charge of $105. per hundred pounds. This key operates the hammer X which hammer is located opposite the ring carrying the printing characters which print the rate per hundred pounds at $105. per hundred pounds. Therefore, if a package were placed on the scale which weighed twenty pounds, the cylinder would be turned until the rate for twenty pounds came opposite the hammer V and by depressing the rate key 105 the cost of sending the twenty pounds would be printed on the way-bill V, since the depression of the said key would operate the connected levers and throw the hammer against the way-bill pressing same against the typewriter ribbon and through which the printing characters would operate to impress the charge on said way-bill. The charge in this case would amount to $21.

We will assume for further illustration that the package weighs twenty pounds and it is being shipped at the rate of $5. per hundred pounds. The key 5 in this case would be depressed after the cylinder had rotated to the corresponding position which would bring the numeral 20 on the ring J opposite the hammer mounted on the lever Q and would bring the rate $1. opposite the hammer and impress this cost on the way-bill V as will be readily understood.

The depression of the key 5 depresses the weight lever M and through the instrumentality of the connecting levers P actuates the bell-crank lever P' to operate the hammer and impress the weight of twenty pounds on the way-bill opposite the charge of $1. In case the rate key 105 were depressed the rate would appear on the way-bill opposite the location of the key 105 as will be readily understood, and, therefore, the way-bill is provided with a margin which extends across the entire length of the cylinder so as to receive the characters which may be printed by depressing any one of the keys. Now, in case a package weighing 20½ pounds were placed on the platform H and the cylinder rotated correspondingly, the depression of the rate key selected in depressing the weight lever M would cause the pin T⁴ to be forced upward into one of the notches nearest to the fraction of the ½ pound limit and turn the scale either backward or forward the fractional distance in order that the hammer which follows this action should impress the weight and rate charged perfectly on the way-bill as herein described. If the scale is slightly over 20½ pounds the cylinder would be rotated to print 21 pounds and should it be slightly under 20½ pounds, the cylinder would be rotated to receive the weight of 20 pounds.

It is obvious from the foregoing description that in order to know the weight and cost of shipping a package of given weight that the person does not have to look at the scale, but simply places the package on the platform and waits until the cylinder has come to rest and then by pressing the rate key indicating the rate per hundred pounds at which the package is being shipped from one point to another, the weight and rate are simultaneously printed on the way-bill and all chance of errors which have heretofore arisen by reason of calculations or optical readings, are eliminated.

Having thus described my invention, what I claim as new is:

1. In a computing scale, a movable element having a plurality of series of type mounted thereon, means for moving said element in accordance with the weight of the material to be weighed, one of said series of type being adapted to indicate weight and other of said series being adapted to indicate the computed price or charge, and means cooperating with said type for simultaneously printing upon a card or paper, the weight of the material together with the computed charge said latter means comprising a price key and a weight bar independently movable with respect to the price key and operated thereby.

2. In a computing scale, a movable element having a plurality of series of type mounted thereon, one of said series being adapted to indicate weight and the other of said series being adapted to indicate charge or price, and means cooperating with said type for imprinting said weight and charge simultaneously upon a paper or card, said means comprising a series of keys corresponding to different rates, mechanism for transmitting the pressure of the keys to the card against the type, and means independent of said transmitting mechanism and operated by any one of the keys for cooperating with the weight indicating type.

3. In a computing scale, a rotary cylinder having a plurality of series of type mounted thereon, means for rotating said cylinder in accordance with the weight of the material to be weighed, one of said series of type being adapted to indicate weight and the other of said series being adapted to indicate charge or price, and means cooperating with said type for imprinting said weight and charge simultaneously upon a paper or card, said means comprising a series of keys corresponding to different rates, mechanism for transmitting the pressure of the keys to the card against the type, and means independent of said transmitting mechanism and operated by any one of the keys for cooperating with the weight indicating type.

4. In a computing scale, a movable element having a plurality of series of type mounted thereon, means for moving said movable element in accordance with the weight of the material to be weighed, one of said series of type being arranged so as to indicate progressively in proportion to the weight of the material and the other of said series being arranged so as to indicate various arbitrary amounts with reference to the weight, means cooperating with the type for imprinting upon a card the required arbitrary amount and means independent of the last named means and operated thereby for cooperating with the series of type for imprinting upon the card the proportionate indication simultaneously with the arbitrary amount.

5. In a computing scale, a movable element having a plurality of series of type mounted thereon, one of said series being adapted to indicate weight and the other of said series being adapted to indicate charge or price, and means cooperating with said type for imprinting said weight and charge simultaneously upon a paper or card, said means comprising a series of keys corresponding to different rates, mechanism for transmitting the pressure of the keys to the card against the type, and means independent of said transmitting mechanism and operated by any one of the keys for cooperating with the weight indicating type, and positioning means for the movable element operated from said weight printing mechanism.

6. In a computing scale, a movable member having a plurality of series of type mounted thereon, a plurality of keys coöperating with said type for printing in various positions with reference to the weight, said movable member having a series of notches corresponding to the positions of the type, a wedge adapted to coöperate with said notches, and yieldable means operated from any one of said keys for transmitting to said wedge the motion of the type coöperating means.

7. In a computing scale, a rotatable member having a series of type mounted on its periphery, one of the series being adapted to indicate weight, and others of said series adapted to indicate various arbitrary amounts with reference to the weight, means coöperating with said weight indicating type for imprinting the weight of the article upon a card, means coöperating with said variously indicating type for imprinting the arbitrary amounts, a plurality of keys for operating the last named means, a connection whereby the weight indicating means is operated from any one of said keys, and means operated by said connection for positioning the rotatable member so as to bring the type in proper operative relation with the type coöperating means.

8. In a computing scale, a rotatable member having a series of type mounted on its periphery, one of the series being adapted to indicate weight and other of said series adapted to indicate various arbitrary amounts with reference to the weight, means coöperating with said weight indicating type for imprinting the weight of the article upon a card, means coöperating with said variously indicating type for imprinting the arbitrary amounts, a plurality of keys for operating the last named means, a connection whereby the weight indicating means is operated from any one of said keys, and means operated by said connection for positioning the rotatable member so as to bring the type in proper operative relation with the type coöperating means, and a yieldable connection for operating said positioning means.

9. In a computing scale, a rotatable member having a series of type mounted on its periphery, one of the series being adapted to indicate weight and others of said series adapted to indicate various arbitrary amounts with reference to the weight, means coöperating with said weight indicating type for imprinting the weight of the article upon a card, means coöperating with said variously indicating type for imprinting the arbitrary amounts, a plurality of keys for operating the last named means, a connection whereby the weight indicating means is operated from any one of said keys, a notched wheel mounted on said rotatable member, a wedge adapted to coöperate with said notches, and yieldable means for transmitting the motion of said connecting means to said wedge so as to position the rotatable member in proper operative relation with the type coöperating means.

10. In a computing scale, a table, a plurality of keys projecting above the table, a rotary cylinder mounted above the table and having series of type which are adapted to be brought into proper position in accordance with the weight of the material to be weighed, a plurality of bars extending underneath the table, links extending upwardly from the bars at a point remote from the keys, and on the opposite side of the cylinder, and hammers pivoted so as to coöperate with the type on the cylinder and connected to the upwardly extending links.

Signed at New York city, in the county of New York and State of New York this 6th day of July A. D. 1911.

GEORG WILHELM MEYER.

Witnesses:
 FRANK M. ASHLEY,
 GEORGE DOAN RUSSELL.